United States Patent [19]

Roach

[11] 4,133,425

[45] Jan. 9, 1979

[54] ACCUMULATING CONVEYOR

[75] Inventor: Gary A. Roach, Trumann, Ark.

[73] Assignee: Roach Manufacturing Corporation, Trumann, Ark.

[21] Appl. No.: 587,907

[22] Filed: Jun. 18, 1975

Related U.S. Application Data

[63] Continuation of Ser. No. 421,224, Dec. 3, 1973, abandoned.

[51] Int. Cl.² .............................................. B65G 13/06
[52] U.S. Cl. .................................................... 198/781
[58] Field of Search ............. 198/127 R, 193, DIG. 7, 198/781, 783, 790

[56] References Cited

U.S. PATENT DOCUMENTS

| 3,297,513 | 1/1967 | Robinson | 198/193 X |
| 3,563,365 | 6/1968 | Loberg | 198/127 R |
| 3,770,102 | 11/1973 | DeGood | 198/127 R |

Primary Examiner—Johnny D. Cherry
Assistant Examiner—Douglas D. Watts
Attorney, Agent, or Firm—Clarence A. O'Brien; Harvey B. Jacobson

[57] ABSTRACT

An accumulating conveyor having a frame, a plurality of carrier rollers rotatably mounted on the frame, a plurality of individully adjustable spring-biased pressure rollers underlying the carrier rollers and a polyvinyl chloride, flat, endless belt arranged with a run thereof disposed between and in engagement with the carrier rollers and their associated pressure rollers for rotatably driving the carrier rollers whenever articles being accumulated on the carrier rollers are free to move.

2 Claims, 6 Drawing Figures

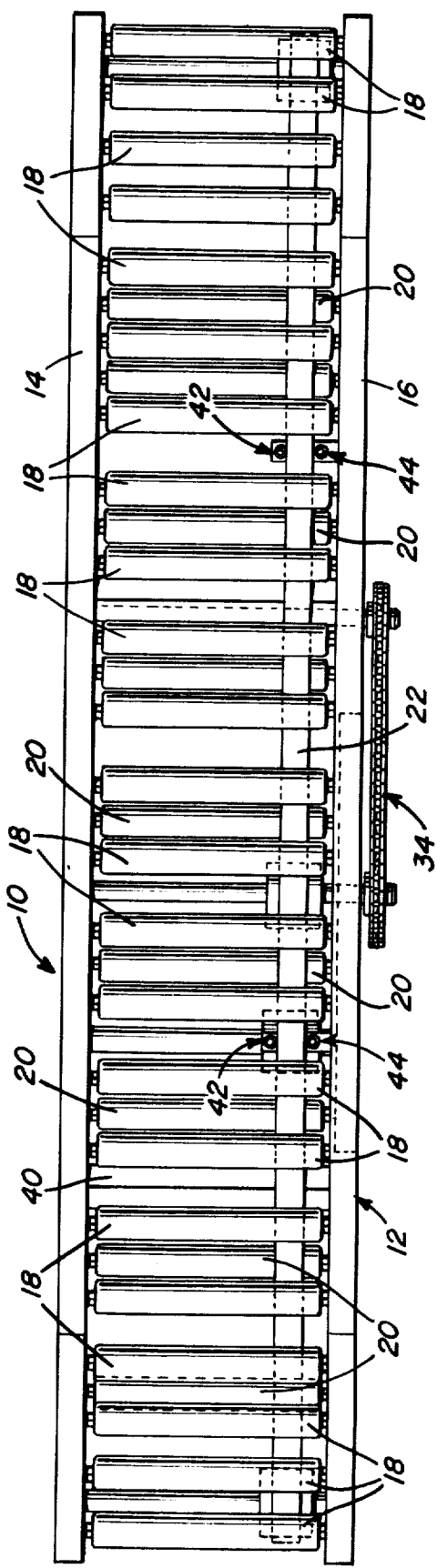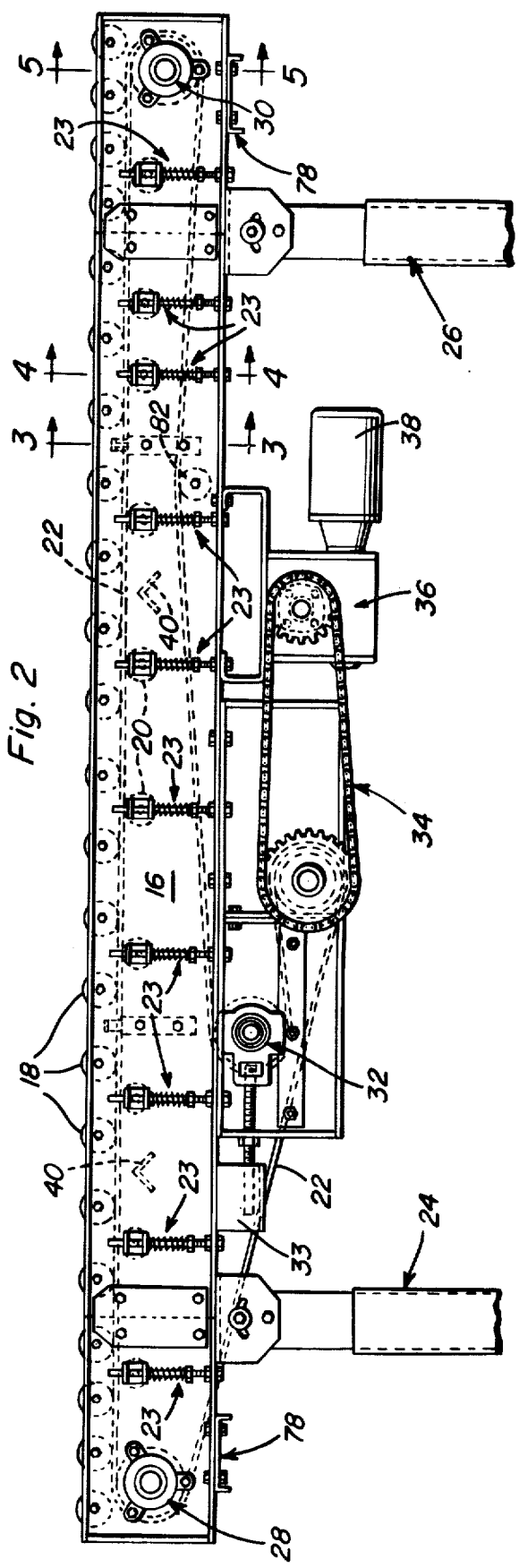

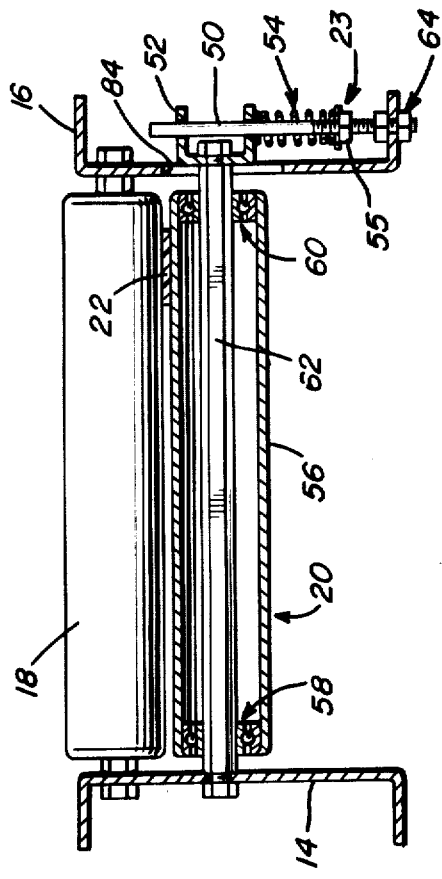
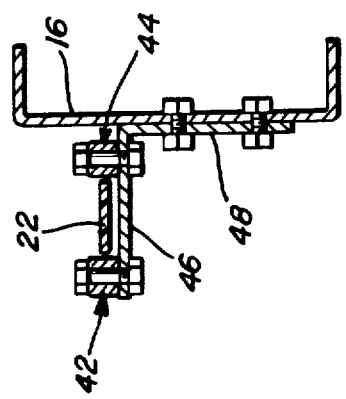
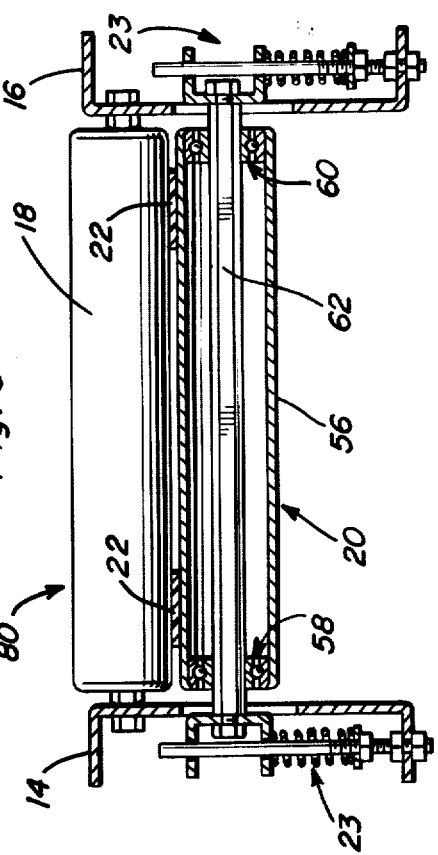
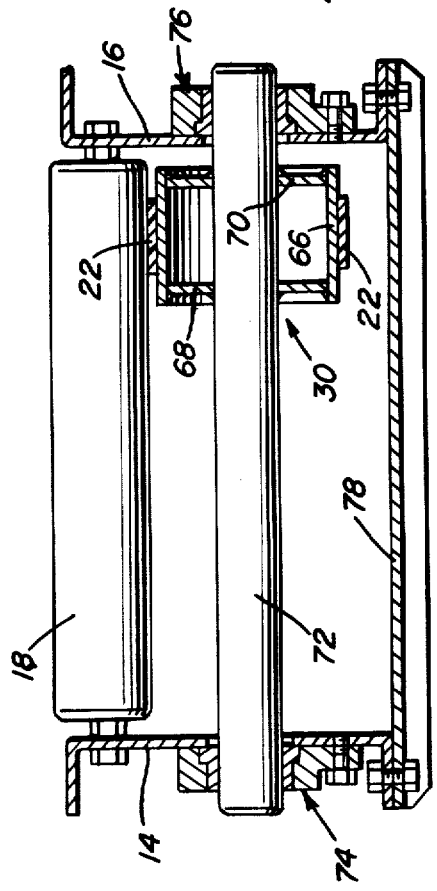

ACCUMULATING CONVEYOR

This is a continuation, of application Ser. No. 421,224, filed Dec. 3, 1973 now abandoned.

BACKGROUND OF THE INVENTION

1. Field of the Invention

This invention relates generally to accumulating conveyors, and particularly to an improved accumulating roller conveyor.

2. Description of the Prior Art

Previously known accumulating conveyors have a number of limitations and disadvantages. For example, some known accumulating conveyors employ carrier rollers which continue to rotate while the product is being accumulated, thus causing frictional damage to the packaging of the product while others fail to generate sufficient motive force on the carrier rollers when conveying heavier loads. Further, some known accumulating conveyors work satisfactorily only in one direction, not being reversible. Others are not adjustable for varying product weight and size. Still others require larger horsepower drives, or have practical length limitations because of the inefficiency of the connections of a plurality of driving belts being employed. Finally, some known accumulating conveyors make it impracticable, if not impossible, to vary the driving force imparted to the carrier rollers. Examples of known accumulating conveyors are disclosed in U.S. Pat. Nos. 1,614,816, issued Jan. 18, 1929 and 3,563,365, issued Feb. 16, 1971.

SUMMARY OF THE INVENTION

It is an object of the present invention to provide an accumulating roller conveyor wherein the driving force imparted to the carrier rollers is variable and is transferred thereto through a flat, relatively thin, polyvinyl chloride belt having a width greater than the diameter of the carrier rollers but substantially less than the length thereof.

It is another object of the present invention to provide an accumulating roller conveyor having individually adjustable spring-biased pressure rollers arranged for driving engagement with the belt thereby driving the associated carrier rollers.

These and other objects are achieved according to the present invention by providing an accumulating conveyor having: a frame; at least one carrier roller rotatably mounted on the frame; a pressure roller rotatably mounted on the frame and arranged adjacent the carrier roller for movement toward and away from same, the pressure roller being further arranged for imparting a driving force to the carrier roller; and an arrangement adjustably biasing the pressure roller towards the carrier roller and varying pressure thereon. The driving force is transmitted from the pressure roller to the carrier roller by a continuous belt. In a usual construction, there will be a plurality of carrier rollers and a plurality of associated pressure rollers, and a run of the continuous belt is arranged extending adjacent all of the carrier rollers and between the carrier rollers and the pressure rollers for rotatably driving the carrier rollers whenever articles being accumulated on the carrier rollers are free to move.

The arrangement mounting the pressure rollers for being adjustably biased with respect to the carrier rollers preferably includes a longitudinally extending member mounted on the frame for adjustment parallel to the longitudinal extent of the longitudinally extending member, a bracket arranged on the longitudinally extending member for rotatably mounting the pressure roller, and a compression spring arranged on the longitudinally extending member between the frame and bracket for biasing the bracket from the frame. The bias exerted by the spring on the bracket being a function of the relationship between the longitudinally extending member and the frame.

Although the adjusting arrangement for the pressure rollers may be provided on only one of a pair of spaced, parallel side rails forming the frame, an advantageous feature of the present invention has such arrangements provided on both of the side rails so as to assure a uniform, free floating biasing of the pressure rollers.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view showing an accumulating roller conveyor according to the present invention.

FIG. 2 is a fragmentary, side elevational view showing the conveyor of FIG. 1.

FIG. 3 is a sectional view of a part of the conveyor shown in FIGS. 1 and 2 as taken generally along the line 3—3 of FIG. 2.

FIG. 4 is a sectional view taken generally along the line 4—4 of FIG. 2.

FIG. 5 is a sectional view taken generally along the line 5—5 of FIG. 2.

FIG. 6 is a sectional view similar to FIG. 4 but showing modified embodiment of an accumulating roller conveyer according to the present invention.

DESCRIPTION OF THE PREFERRED EMBODIMENTS

Referring now more particularly to FIGS. 1 and 2 of the drawings, an accumulating conveyor 10 according to the present invention has a frame 12 including a pair of spaced, parallel, longitudinal side rails 14 and 16, a plurality of carrier rollers rotatably mounted on the frame, and a plurality of independently adjustable pressure rollers 20 also rotatably mounted on the frame in a manner to be described below and arranged adjacent rollers 18 for movement toward and away from same. A single, continuous driving belt 22 has an upper run arranged adjacent the planar row of carrier rollers 18 and extending between the row of rollers 18 and the parallel plane of the row of pressure rollers 20. That is, rollers 18 and 20 lie in respective parallel planes, and the upper run of belt 22 lies in a plane parallel to the planes of rollers 18 and 20 and arranged between the latter planes. The purpose of the pressure rollers is to bias the driving belt 22 against carrier rollers 18 and cause same to rotate, provided the force of accumulated articles (not shown) being carried by rolles 18 is not sufficient to overcome the driving force. Each pressure roller 20 is individually, adjustably biased toward the plane of the carrier rollers 18 by an adjusting arrangement 23 to be described in detail below.

As can best be seen in FIG. 2 of the drawings, frame 12 is supported as by a suitable number of adjustable legs 24 and 26 so as to be arranged at a desired angle with respect to a supporting surface (not shown). A pair of pulleys 28 and 30, one forming the head pulley and the other the tail pulley in dependence on the reversible direction of travel on the carrier rollers 18, define the end limits of the upper run of belt 22. Along the bottom run of belt 22 is arranged an adjustable take-up device 32 having a threaded rod and cooperating nut arrangement permitting a desired tension to be placed on belt 22. A shield 33 is arranged over the free end of the threaded rod as a safety measure. The pulley which the threaded rod and nut arrangement positions is mounted beneath frame 12 in a suitable manner, such as by the illustrated bracket. Also mounted on the bracket or framework arranged beneath frame 12 is a pulley mounted for rotation with part of a chain and sprocket drive train 34, the other end of which is mounted to a conventional gear box 36 actuated by a suitable motor 38. Transverse V-shape braces 40, formed from angle iron or steel and the like, connect together rails 14 and 16 and generally rigidify frame 12.

A pair of sets of post assemblies 42 and 44 are shown as spaced along conveyor 10. As can best be seen from FIG. 3 of the drawings, these post assemblies 42, 44 are mounted in a conventional manner on a leg 46 of an angle bracket 48 in turn conventionally mounted on frame 16. As can readily be appreciated from the drawings, the purpose of these post assemblies 42, 44 is to guide belt 22 along a predetermined path.

Referring now to FIG. 4 of the drawings, arrangement 23 includes a longitudinally extending member 50, advantageously in the form of the illustrated rod, mounted on, for example, frame 16 in such a manner as to permit adjustment of member 50 parallel to the longitudinal extent of same. A bracket 52, which may be in the form of the illustrated channel element, is arranged on member 50 as by a pair of opposed holes provided in channels of member 52, and the pressure roller 20 is rotatably mounted on bracket 52 in a manner to be described below. A suitable, known biasing element, such as illustrated coiled compression spring 54, is arranged on member 50 so that the coils of spring 54 wrap around member 50, between a flange of rail 16 on which member 50 is adjustably mounted and the lower flange of bracket 52. The spring abuts a nut 55 to be described in more detail below. In this manner, spring 54 biases bracket 52 away from the lower flange of rail 16, with the bias asserted by the spring 54 being a function of the relationship between the longitudinally extending member 50 and nut 55. As can be readily appreciated from FIG. 4, each pressure roller 20 is formed from a tube 56 having conventional bearings 58 and 60 fitted in end portions thereof and journaling a, for example, hex shaft 62. One end of shaft 62 passes through an opening provided in the web portion of rail 16 and a matched opening in bracket 52, while the other end passes through a substantially mating opening in the web of rail 14. It is to be understood that the opening in the web of rail 16 through which the one end of shaft 62 passes is enlarged, perhaps elongated, so as to permit movement of shaft 62 relative to rail 16 and pressure rollers 18. The end of member 50 connected to the appropriate flange of rail 16 is advantageously provided with screw threads. In this manner, the threaded end of member 50 is passed through a suitable opening provided in the flange of rail 16 and adjustably connected to the flange as by the illustrated double-nut arrangement 64.

FIG. 5 of the drawings shows a typical arrangement of the end pulleys 28 and 30. Specifically, pulley 30 is formed from a tube 66 having fitted in the end portions thereof washers 68, themselves mounted on a cylindrical shaft 72 for rotation therewith. Shaft 72 is in turn journaled in bearings 74 and 76 mounted on and associated with rails 14 and 16, respectively. Channels 78 may be connected to and arranged extending between rails 14 and 16 for further rigidifying frame 12.

FIG. 6 of the drawings shows a modified arrangement of a conveyor 80 according to the present invention. As can be readily appreciated from FIG. 6, conveyor 80 is identical to conveyor 10, except that arrangement 23 is duplicated on rail 14 and a belt 22 is arranged adjacent rail 14 as well as adjacent rail 16. Although the embodiment of FIG. 6 entails additional structure when compared to the embodiment of FIGS. 1 to 5, it will be readily appreciated that the provision of biasing means at either end of a shaft 62 of the pressure rollers 20 will permit realization of a more uniform free-floating biasing of the pressure rollers 20 against belt 22 and toward carrier rollers 18.

Summarizing the above, carrier rollers 18 are mounted in channel rails 16, 14 as by having the axles thereof arranged in openings provided in the web portions of rails 16, 14. It is to be understood that carrier rollers 18 may be constructed in a manner similar to that shown in FIGS. 4 and 6 for pressure rollers 20. Below and between carrier rollers 18 are mounted a lesser number of pressure rollers 20. In the lower portion of rails 16 and 14 are mounted a number of return rollers 82 sufficient to carry driving belt 22 on the return course thereof. In the embodiment shown in FIG. 6 of the drawings, these rollers will be provided for both belts 22, as will other necessary components such as pulleys 28 and 30. The advantage of the two belts is to increase and distribute the frictional driving forces being applied to carrier rollers 18.

As indicated in FIG. 4 of the drawings, carrier rollers 18 are held in place in rails 16 and 14 by means of the axles associated with rollers 18. Pressure rollers 20, however, are supported on, for example, at least the left hand side by channel 14, while the right hand side is inserted into a slot 84 provided in the web portion of rail 16. The right hand side, being free to move vertically up and down in slot 84, is held firmly in a predetermined position by the channel bracket 52. This arrangement 23 can be on either one side of frame 12 or both, as is shown in FIGS. 4 and 6. At the same time, bracket 52 is free floating on the stud or longitudinally extending member 50. Compression spring 54 surrounding member 50 below bracket 52 provides the free-floating effect. The length of spring 54 may be varied by means of the double-nut arrangement 64 threaded onto the lower threaded end of member 50, which is arranged beneath spring 54. Preferably, a, for example, counter-clockwise rotation of nut 55 associated with the threaded end of member 50 and abutting an end of spring 54 is employed to, for example, shorten the length of spring 54 and thereby cause spring 54 to increase the force or bias exerted upon bracket 52. Bracket 52 transmits this force to pressure rollers 20, causing the pressure rollers 20 to increase the force of driving belt 22 against carrier rollers 18. By varying the strength and/or length of spring 54, the driving force transmitted to carrier rollers 18 can be varied to a minimum back pressure of, for example, 2% of the total accumulated product weight (not shown) and to a maximum of, for example, 35% of the total accumulated product weight.

The driving belt 22 being constructed of a polyvinyl chloride material has a stretch factor of less than approximately ½% of the total length of belt 22 as compared with standard rubber coated cotton duck belts or rubber coated polyester cord belts which have approximately a 2% stretch. The belt may be made continuous as by, for example, steel lacings joining the ends of a strip of same. The width of the belt 22 may be greater than the diameter of the rollers which are of standard metal material and may have a length commensurate with the product size. The rollers usually range in length from 13 inches to 4 feet. The belt will vary in width between 1 and 3 inches depending on the length of the rollers with a 2 inch belt being a preferable width for use with rollers up to 2 inches in diameter with the thickness of the belt being approximately ¼ inch as compared with standard flat belts which are from 6–12 inches wide to provide adequate strength and standard V-belts which are approximately ⅝ inch wide and ⅜ inch thick. The smaller surface contact of belt 22 provides a more effective adjustment due to the smaller friction contact area but does not reduce the contact area to the small area of a V-belt which concentrates wear and introduces drive force transfer problems. The horsepower requirements for motor 35 may range from, for example, ¼ horsepower to 3 horsepower for most typical loadings. Conveyor sections up to, for example, 250 feet in total length can be driven by a single drive utilizing only one belt 22 over the entire length of a conveyor 10, 80.

As can be readily understood from the above description and from the drawings, an accumulating roller conveyor according to the present invention will eliminate undesirable carrier roller rotation while the product is being accumulated, since pressure rollers 20 are free floating and able to absorb the driving force from belt 22 when products (not shown) accumulating on carrier rollers 18 are resisting rotation of the carrier rollers. Further, more efficient operation and flexibility of size of the conveying unit are made feasible.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An accumulating conveyor, comprising, in combination:

(a) a frame including a pair of spaced, parallel, longitudinal side rails in the form of channels each having a web and a pair of codirectional flanges extending from the web;

(b) a plurality of carrier rollers rotatably mounted on and extending between the rails;

(c) a plurality of pressure rollers rotatably mounted on and extending between the rails and arranged adjacent and below the carrier rollers for movement toward and away from same;

(d) a single, continuous, flat driving belt arranged adjacent and contacting all of the rollers; and (e) means for adjustably biasing one end of the pressure rollers toward the carrier rollers and varying the driving force exerted on the belt, the other ends of the pressure rollers being vertically fixed, the means for adjustably biasing including a plurality of longitudinally extending, codirectional members each mounted on a lower one of the flanges of one of the rails by a double-nut arrangement for individual adjustment parallel to the longitudinal extent of the member, a plurality of channel brackets arranged on the members, with each member having a separate bracket thereon, each bracket having legs provided with apertures, the members slidably disposed in the apertures, each pressure roller having a shaft extending through an associated slot provided in the web of the rail and mounted on the bracket, and a compression spring adjustably arranged on the member between the rail and the bracket for biasing each pressure roller toward the belt and carrier rollers, each member having a further nut threadingly, adjustably mounted on the member abutting the lower end of the spring for adjusting the bias exerted on the pressure rollers, said driving belt being arranged with a run extending between a plane in which the carrier rollers are arranged and a plane in which the pressure rollers are arranged for being biased against the carrier rollers by the pressure rollers and imparting rotary motion to the carrier rollers, said belt being oriented adjacent the end of the pressure rollers which are adjustably supported from the rail and having a width at least equal to the diameter of the carrier rollers and on the order of 1 to 3″, but substantially less than the length thereof, being relatively thin on the order of ¼″, and constructed of polyvinyl chloride material having a stretch of approximately ½% of its over-all length.

2. The structure as defined in claim 1 wherein said belt has a width of approximately 2″ when the rollers have a diameter up to 2″.

* * * * *